July 3, 1973     M. J. P. BOGART     3,743,699

PROCESS FOR AMMONIA MANUFACTURE

Filed May 27, 1971     3 Sheets-Sheet 1

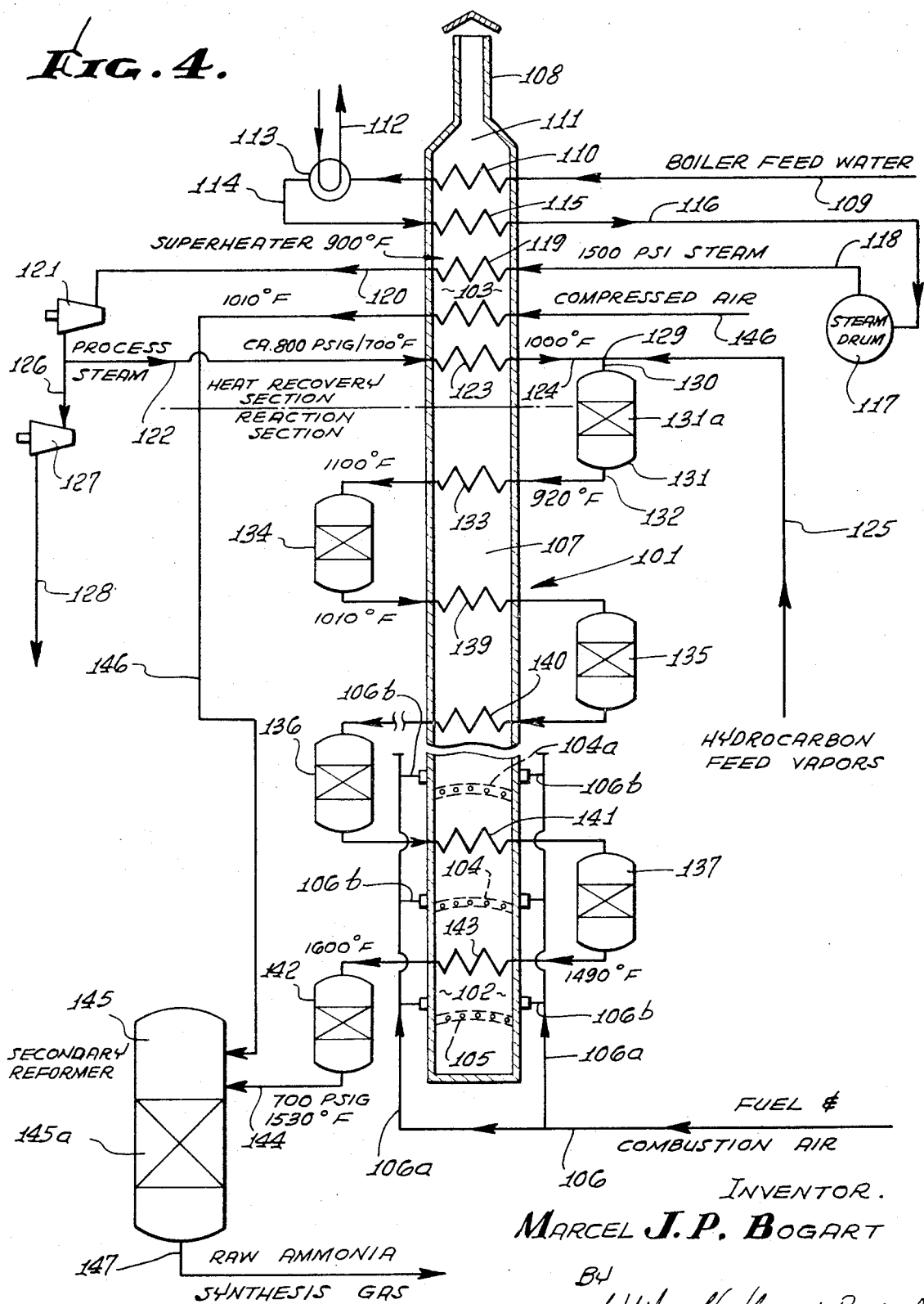

United States Patent Office 3,743,699
Patented July 3, 1973

3,743,699
PROCESS FOR AMMONIA MANUFACTURE
Marcel J. P. Bogart, Whittier, Calif., assignor to Fluor Corporation, Los Angeles, Calif.
Filed May 27, 1971, Ser. No. 147,408
Int. Cl. C01c 1/04; B01j 9/00
U.S. Cl. 423—359
24 Claims

ABSTRACT OF THE DISCLOSURE

Organic physical solvent removal of carbon dioxide and other acid gases is economic in ammonia manufacturing where the shift reactor effluent containing the acid gases and excess heat is indirectly heat exchanged with a closed absorption refrigeration cycle used to supply refrigeration for ammonia production, in lieu of mechanical compression for refrigeration.

BACKGROUND OF THE INVENTION

This invention has to do with processes for the manufacture of ammonia and, more particularly, with such processes in which there is utilization of energy in the form of excess heat present in shift reactor effluent streams in a novel and economical manner to supply energy requirements of an absorption refrigeration cycle used in lieu of mechanical refrigeration to condense the ammonia product.

A particularly significant advantage of the invention is the economic use of organic solvents in place of conventional chemical absorbents such as activated potassium carbonate to remove carbon dioxide and other acid gases from the shift effluent before being passed to the ammonia converters. Very little heat is required to regenerate a physical solvent, while a large amount is required to regenerate a chemical solvent. The heat content of shift reactor effluent streams formerly used in regeneration of chemical solvents is thus available to supply the energy requirements of a closed absorption refrigeration cycle which is used to separate ammonia product. In addition, refrigeration may be supplied to the physical solvent system as required.

The synthesis of ammonia is according to the reaction (1) $$3H_2 + N_2 \rightarrow 2NH_3$$

that is, hydrogen is combined with nitrogen over a suitable catalyst and at elevated temperatures and pressure. Because the reaction is relatively inefficient, multiple passes of reactants through the reaction zone are made with product ammonia being separated by condensation from the hydrogen and nitrogen. The cooling of the synthesis zone gas products to separate ammonia is effected by indirect heat exchange with a refrigerant such as ammonia which circulates through a system being cycled from a liquid to a gas to obtain the necessary cold, e.g. to enable cooling the ammonia synthesis zone gas product to between −15 and +100° F. for condensation, depending on synthesis zone pressures. In modern, conventional ammonia plants where a chemical $CO_2$ absorbent is used, compression refrigeration is employed which requires substantial input of power to drive compressors. As will be evident to those familiar with the manufacture of ammonia from hydrocarbon feedstocks, there is first generated a synthesis gas according to the equation (2) $$CH_4 + H_2O \rightarrow CO + 3H_2$$

representing the reforming of sulfur-free methane with steam, over a suitable catalyst in a primary reformer, or ranging to higher hydrocarbons, e.g. by the equation (3) $$C_{20}H_{40} + 10O_2 \rightarrow 20CO + 20H_2$$

representing the partial oxidation or gasification of high boiling hydrocarbons such as fuel oil by reaction with high purity oxygen, in the presence of steam, in special reactors.

In the case of reforming of light hydrocarbon, air or nitrogen is mixed with the primary reformer effluent and the mixture is reacted in a secondary reformer. The secondary reformer effluent, a mixture comprising $H_2O$, $CO_2$, $N_2$, CO and $H_2$, is then further reacted to effect the so-called water-gas shift reaction according to the equation (4) $$CO + H_2O \rightarrow CO_2 + H_2$$

whereby a mixture of carbon dioxide, nitrogen and hydrogen is obtained. Excess steam is condensed and the $CO_2$ removed from the water-gas shift effluent to leave the proper reactants for reaction Equation 1 above, i.e. substantially $H_2$ and $N_2$.

It has been the practice to remove $CO_2$ and $H_2S$, if present, by chemical means, typically by chemical combination with aqueous solutions of potassium carbonate. A variety of commercial regenerative processes are known today for this purpose; $CO_2$ and $H_2S$ are removed by combining chemically with the potassium carbonate, the potassium carbonate is regenerated for reuse by heating the combination to drive off $CO_2$ and $H_2S$. It is well known that this technique requires considerable heat. In previously known ammonia production processes, this has not been unduly disadvantageous since great quantities of heat are available as excess at various points in the process, such as in the effluent from the shift reactors and the by-product heat can be economically used to regenerate the potassium carbonate.

PRIOR ART

The state of the art is as indicated next above, excess heat content of shift effluent has been used to regenerate chemical $CO_2/H_2S$ removal reagents. The use of organic physical solvents to remove $CO_2$ has been widely practiced in other processes where $CO_2$ is removed at relatively high pressures (700 p.s.i.g. and above). Such use has been thought to be uneconomic in ammonia manufacturing processes, however, because $CO_2$ is removed conventionally in ammonia plants at a pressure of about 400 p.s.i.g. In addition, regeneration of organic physical solvents for $CO_2$ is by depressurizing and/or inert gas stripping of the solvent, that is heat is not consumed in regeneration, so the excess heat from plant process streams, as in the shift effluent, which is ideal for chemical reagent regeneration, has up to now had no ready utility and may have had to be wasted, at considerable cost.

SUMMARY OF THE INVENTION

It is a major objective of the present invention to provide a process for the manufacture of ammonia in which organic physical solvents are economically useful for $CO_2$ removal. It is a further object to provide a novel sequence of heat exchange to reduce overall energy requirements and to enable efficient utilization of excess heat in the shift reactor effluent to replace power conventionally used for refrigeration.

In general, in the present process for the manufacture of ammonia, the conventional chemical solvent is replaced by an organic physical solvent for the removal of $CO_2$ and other acid gases such as $H_2S$ and efficiently uses excess heat thereby made available to regenerate the refrigerant in an absorption refrigeration system used in lieu of mechanical refrigeration.

More specifically, the invention provides, in the manufacture of ammonia by reaction of nitrogen with hydrogen obtained from shift effluent, the process which includes indirectly heat exchanging the hydrogen containing shift effluent with a refrigerant-solvent mixture circulating in a closed absorption-refrigeration cycle, absorbing carbon dioxide from the effluent with an organic physical solvent such as propylene carbonate, reacting effluent hydrogen with nitrogen in an ammonia synthesis zone and indirectly heat exchanging the synthesis zone gases with refrigerant in the refrigeration cycle to separate ammonia therefrom. Particular features of an embodiment of the process include use of ammonia as the cycle refrigerant and water as the solvent therefor and in another embodiment the use of water as refrigerant and aqueous lithium bromide as the solvent therefor, employing shift reactor effluent at a pressure above about 250 p.s.i.g., and cooling the product ammonia to a temperature between about −15° and +100° F.

The process further may include removal of $CO_2$ and other acid gases from the shift effluent at a pressure above about 700 p.s.i.g.

In a preferred embodiment, the process includes generating a shift reactor effluent, by steam reforming of light hydrocarbons or partial oxidation of heavy hydrocarbons, to contain hydrogen, operating a closed ammonia-water absorption-refrigeration cycle including an absorption zone, a fractionation zone adapted to separate ammonia from water and an expansion zone adapted to evaporate ammonia to produce cold, supplying the fractionation zone heat demand by indirect heat exchange with the shift effluent, separating carbon dioxide and other acid gases from the cooled effluent at a pressure above about 700 p.s.i.g. by absorption with an organic physical solvent, e.g. propylene carbonate, reacting the effluent hydrogen free of carbon dioxide with nitrogen in an ammonia synthesis zone to form ammonia product, indirectly heat exchanging the ammonia product with ammonia refrigerated to condense the ammonia product and returning the vaporized ammonia refrigerant to the closed cycle for regeneration. The ammonia product is typically cooled to between −15 and +100° F.

The closed absorption refrigeration cycle preferably includes a fractionation zone comprising plural fractionation columns operating at different pressure and temperature conditions and in series flow connection for successively higher pressure and higher temperature distillations of the ammonia refrigerant absorbed in a solvent. The process includes effecting the refrigerant fractionation in such plural fractionation columns by reboiling the lower pressure fractionation column liquids against an available heat source such as stream or a process stream available e.g. at a temperature lower than that of the shift effluent and reboiling the higher pressure fractionation column against the shift effluent only.

The process further may include use of shift effluent at high pressure, e.g. above about 700 p.s.i.g. For this purpose, in one embodiment of the invention, the process includes a steam reforming a hydrocarbon feed to hydrogen and by-products at a pressure above about 700 p.s.i.g. in plural adiabatic reforming reactors arranged in series flow connection, combining the reforming reactor effluent with air for secondary reforming and thereafter subjecting the adiabatic reactor effluent to the water gas shift reaction at a pressure above about 700 p.s.i.g. to generate the shift reactor effluent.

In a specific embodiment the invention includes with respect to the aforementioned processes for ammonia manufacture, operating a closed ammonia-water absorption-refrigeration cycle comprising an absorption zone, a fractionation zone and an expansion zone, the fractionation zone having a relatively lower pressure first fractionation column adapted to separate ammonia and water overhead and a second fractionation column adapted to separate substantially water-free ammonia overhead. The cycle operation includes feeding the first column overhead to the second column and recycling the second column bottoms to the first column, heating the second column by heat exchange with the shift effluent, vaporizing the second column overhead product in the expansion zone and heat exchanging the expanded and thus cooled second column overhead product with synthesis zone gases to cool formed ammonia product and separate the same, e.g. by condensation. The first column bottom liquids may also be heated with the shift effluent and the first column operated at a pressure between about 110 and 250 p.s.i.g., and a bottom temperature between about 290° and 400° F. The second column may be operated at a pressure between about 165 and 300 p.s.i.g., and a top temperature between about 90° and 125° F.

BRIEF DESCRIPTION OF THE DRAWINGS

The invention will be further described as to an illustrative embodiment in connection with the attached drawings, in which:

FIG. 4 is a schematic flow sheet depicting an apparatus for generating a high pressure ammonia synthesis gas for use in the present process.

DESCRIPTION OF THE PREFERRED EMBODIMENTS

The terms "shift effluent" and "shift reactor effluent" herein each refer to the product output of a water-gas shift reactor in which hydrogen and $CO_2$ are generated from steam and CO as in Equation 4. This effluent may contain trace amounts of noble gases and some hydrocarbon, each subsequently removed, as well as the $CO_2$, leaving the hydrogen for reaction with nitrogen to form ammonia.

As indicated above, the invention obtains the benefits of a physical solvent removal system for $CO_2$ and other acid gases such as $H_2S$ from shift effluent and also recovers available by-product heat in the plant gas streams, particularly in the shift effluent, in an economical manner by using this heat to satisfy refrigeration requirements of the ammonia synthesis zone. In general, this is accomplished with the use of a closed absorption-refrigeration cycle connected into the ammonia synthesis zone so that heat consuming elements of the refrigeration system are supplied with heat from the cooling and condensing of shift effluent gases, i.e. the heat demand of the fractionation portion of the refrigeration system is satisfied with heat which is excess in the shift effluent. In theory, other hot process streams available in the plant could be used as the required heat source, but such process streams are generally more efficiently utilized for other purposes, such as raising high pressure steam. It will be observed that the available temperature level of shift effluent gases is typically too low for economical integrated use other than in the absorption refrigeration system, or as discussed above, in regeneration of chemical absorber solutions for removal of $CO_2$ and $H_2S$.

Figure 1:
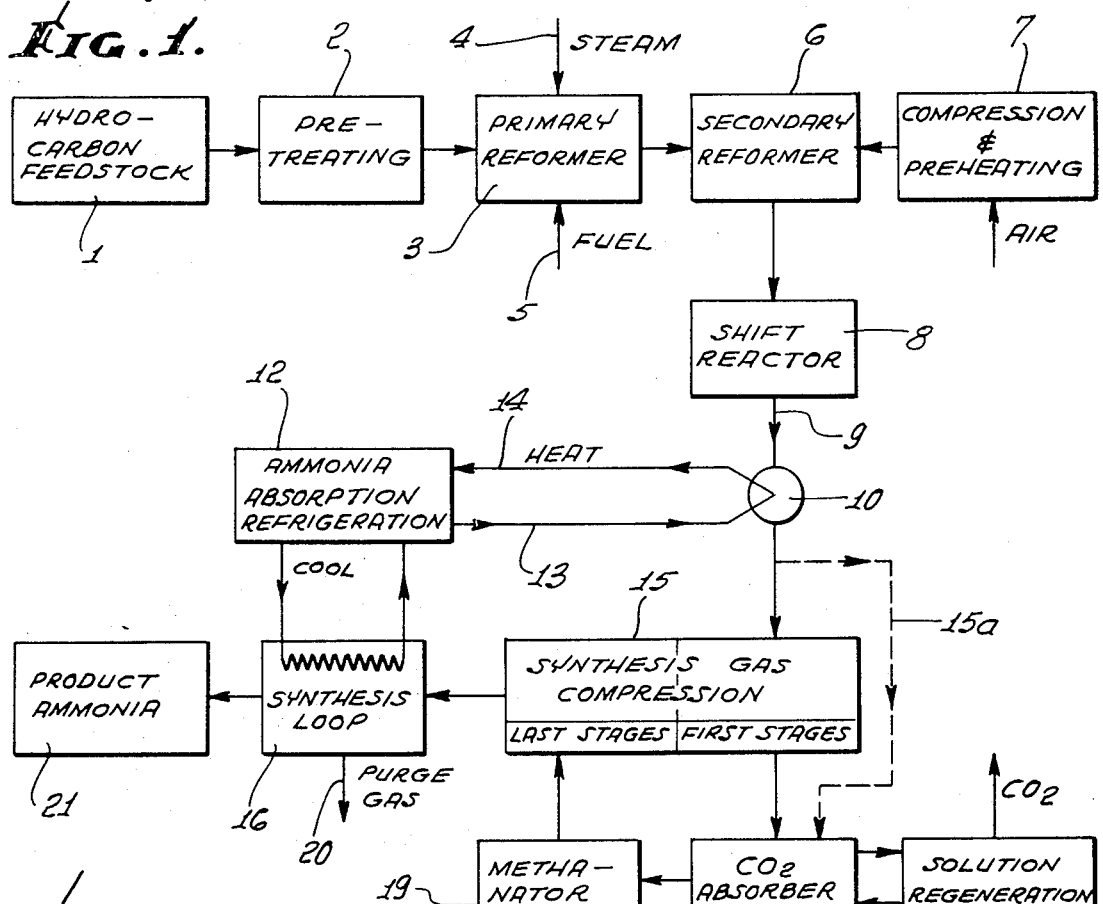
FIG. 1 is a schematic flow sheet of an ammonia manufacturing process according to the invention with the ammonia synthesis feed being obtained from reforming of light hydrocarbons.

With reference to FIG. 1, a light hydrocarbon feedstock having a composition ranging from methane through napha is fed into the ammonia plant at 1, passed through a pretreater 2 for any required conditioning, such as sulfur removal, prior to entry into the primary reformer 3 where the hydrocarbon is mixed with steam from line 4 and heated to very high temperatures known per se, e.g. 1000° F. and higher by burning fuel from line 5 in a suitable furnace arrangement. A particularly advantageous primary reformer arrangement is shown in FIG. 4 and will be later described. The effluent from primary reformer 3 is passed to a secondary reformer 6 where air, preheated and compressed at 7, is mixed with the primary reformer effluent to supply nitrogen to the process stream. The conversion of CO to $CO_2$ is effected in shift reactor 8 cf. Equation 4 above, whereby shift effluent in line 9 comprises, nitrogen, hydrogen, steam and carbon dioxide with quite minor amounts, generally less than 1%, of any other single component. The shift effluent is passed along line 9 through heat exchange unit 10 for heat exchange with absorption refrigeration cycle 12 through lines 13 and 14 as explained hereinafter in connection with FIG. 3. The shift effluent following the heat exchange and substantially cooled, with condensation of a large portion of its steam content, is passed to the first (low-pressure) stages of a compression zone 15 where the shift effluent gas is compressed to an intermediate pressure for $CO_2$ removal by an organic physical solvent in absorber 17 and trace impurity removal by conventional means such as a methanator 19 after which additional compression is employed in the last stages of compression zone 15 to attain a suitable pressure for conversion to ammonia in synthesis zone 16. As indicated, the compression zone 15 includes progressive compression stages. It is advantageous where reformer 3 is operated at pressures in the range of 250 to 700 p.s.i.g., i.e. less than the FIG. 4 reformer embodiment, to precompress the shift effluent prior to contact with the $CO_2$ removal solvent as described above. If the pressure of the shift effluent however is 700 p.s.i.g. or above the effluent may be by-passed along line 15a around the first compression stages directly to the $CO_2$ absorber 17. $CO_2$ absorber 17 comprises means to contact under pressure the $CO_2$-containing shift effluent for removal of the $CO_2$, $H_2S$ and other acid gas present, with organic physical solvent such as propylene carbonate, methanol, acetone, and sulfolane or any other organic physical solvent for $CO_2$ and the like, e.g. organic liquids containing combined oxygen. The mixture of $CO_2$ and physical solvent is passed to a solution regeneration zone 18 where $CO_2$ and other acid gases are removed by depressurizing and/or by stripping by conventional means such as with air or other inert gas, e.g. nitrogen, with the $CO_2$ being recovered or vented to atmosphere; the lean solvent is returned to the absorber 17 for reabsorption of $CO_2$.

Figure 2:
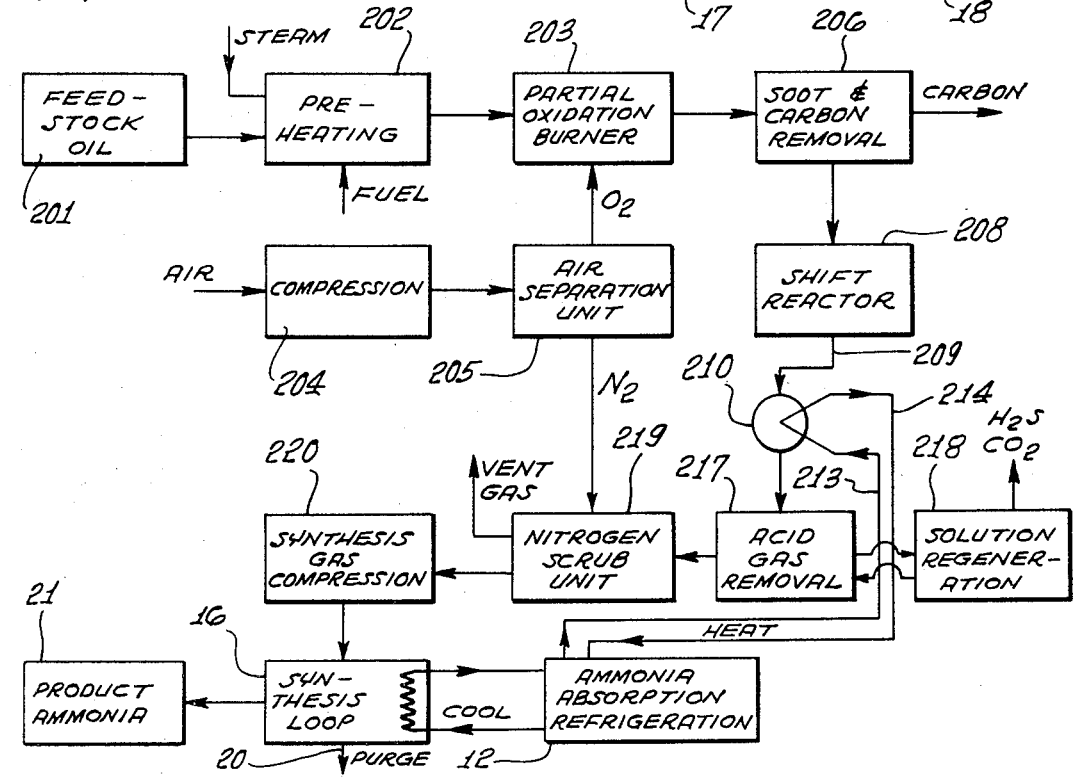
FIG. 2 is a schematic flow sheet like FIG. 1 of an ammonia manufacturing process with the ammonia synthesis feed being obtained from gasification of heavy hydrocarbons.

With reference to FIG. 2, an arrangement adapted to manufacture of ammonia from heavy hydrocarbons such as black fuel oil by the partial oxidation or gasification route is shown. The heavy hydrocarbons are fed into the reaction system at 201, combined with steam under pressure in fuel-fired preheater 202 and passed to partial oxidation burner 203 where oxygen is combined with the feed for a decomposition reaction producing CO, $H_2$ and some $CO_2$ as in Equation 3 above. Oxygen for the oxidation reaction is provided by air separation plant including compression zone 204, and a separator 205. Nitrogen from separator 205 is passed to the ammonia synthesis loop 16 as will be described. The reaction products from burner 203 are passed to a soot and carbon removal zone 206 where the solid products are separated from the gaseous products to waste or use for their carbon content. The gaseous products are passed to shift reactor 208 where CO is catalytically converted to $CO_2$ as described above in connection with FIG. 1. The shift effluent from reactor 208 in line 209 comprises hydrogen, steam and carbon dioxide with quite minor amounts, generally less than 1% by weight, of any other single component. The shift effluent is passed along line 209 through heat exchanger unit 210 for heat exchange with absorption-refrigeration cycle 12 through lines 213, 214 as is explained hereinafter (cf. FIG. 3) with reference to corresponding lines 13, 14 in FIG. 1. The shift effluent, following the heat exchange and substantially cooled with condensation of a large portion of its steam content is passed to an acid gas removal zone 217 wherein are provided means to contact under pressure the $CO_2$-containing shift effluent with an organic physical solvent for $CO_2$, $H_2S$ and any other acid gas present, such as those solvents mentioned above. The acid gases dissolved in the physical solvent are passed to a solution regeneration zone 218 where the gases are removed by depressurizing and/or by stripping by conventional means such as with air or other inert gas, e.g. nitrogen, with the $CO_2$, $H_2S$ being recovered or vented to atmosphere; the lean solvent is returned to the absorber 217 for reuse.

The $CO_2$-depleted shift effluent is then passed to unit 219 where residual methane and carbon oxides may be removed, e.g. by scrubbing with liquid nitrogen, while the nitrogen for ammonia synthesis is introduced from air separator 205. Unwanted gas components may be vented to atmosphere as shown. The purified effluent comprising the synthesis gas is fed to synthesis gas compression unit 220 and following compression to ammonia synthesis loop 16.

The ammonia synthesis loop 16 is common to both the steam reforming route of FIG. 1 and the partial oxidation route of FIG. 2, as are the product cooling and separation steps including the absorption-refrigeration cycles 12. Accordingly, the reference to the FIGS. 1 and 2 embodiments, the synthesis gas is passed into synthesis loop 16, where a catalytic ammonia converter of conventional design produces ammonia by Equation 1 above at temperatures in the range of 400 to 500° F. and at pressures ranging from 1,500 to 10,000 p.s.i.g. Only a portion of the reactants are converted in each pass through the converter, with produced ammonia being removed by condensation from the other reaction product gases, hydrogen and nitrogen to collector 21.

The condensation removal of ammonia is effected by cooling the synthesis zone product to −15 to +100° F., at a pressure in the range of 1,500 to 10,000 p.s.i.g. Cooling is accomplished by an ammonia/water absorption refrigeration cycle 12 (ammonia the refrigerant and water the solvent) which is illustrative of absorption refrigerant systems which may be used in the present process. Another example of an absorption refrigeration system is lithium bromide and water (water the refrigerant and aqueous lithium bromide the solvent) as well as other systems comprising a refrigerant and a solvent therefor. Particularly at the lower end of the above temperature scale, necessary cooling is provided by evaporation of a refrigerant such as ammonia. In prior known processes the refrigerant is vaporized by heat exchange with the synthesis zone product and thereafter mechanically recompressed and condensed for recycle as liquid refrigerant.

It is with the elimination of the need for mechanical compression of the refrigerant and its attendant energy requirement disadvantages that the present invention is particularly concerned in one aspect. The present invention uses absorption of the vaporized refrigerant in a suitable solvent in place of mechanical compression to return the refrigerant to the liquid state. The present process then employs distillation under pressure for separation of the refrigerant from solvent in order to provide a liquified refrigerant for recycle. Refrigeration at several different temperature levels is readily achieved.

The economic use of shift reactor effluent gas stream heat, liberated by cooling of the gases and condensation of steam from the effluent, to supply the energy needed to regenerate the refrigerant is a signal feature of the present process, along with the resulting economy in removal of $CO_2$ by the use of an organic physical solvent regenerable without heat.

In a conventional absorption refrigeration cycle the cycle includes a chiller or evaporator wherein condensed refrigerant ammonia is vaporized to generate cold. This cold is transferred to the synthesis zone heat exchange there with product gases, to condense product ammonia. The vaporized refrigerant from the evaporator, typically at 20° F. and 33 p.s.i.g., is passed to a contactor, a water- or air-cooled heat exchanger, for mixing with a weak aqua stream (solvent water containing, say 0.1 to 10% by weight refrigerant) to form a condensed and liquefied refrigerant-water mixture containing from 15 up to 60% refrigerant (strong aqua). The strong aqua mixture is pumped to a fractionation column of conventional design, containing trays, packing or other liquid-vapor contacting expedients.

The column bottom liquid is reboiled aaginst relatively warm streams to distill the refrigerant. Column overhead comprises highly pure refrigerant which is condensed and partly refluxed, the remainder being passed to one or more evaporators for cold generation by vaporization of refrigerant as just described.

It will be noted that no mechanical compression is used to regenerate the refrigerant in an absorption refrigeration cycle, the only energy input (except for minor pumping requirements) is heat to the column feed and column reboiler to distill refrigerant.

In one embodiment of the present invention, provision is made for the operation of an absorption refrigeration cycle such as closed ammonia absorption cycle entirely, or nearly so, from the heat available in conventional shift effluent. This embodiment may be illustrated with shaft effluent pressures of, e.g. 400 p.s.i.g., with the understanding that the principles involved are applicable to such shift effluents having pressures from 200 to 600 p.s.i.g. and higher and preferably 250 to 500 p.s.i.g.

Figure 3:
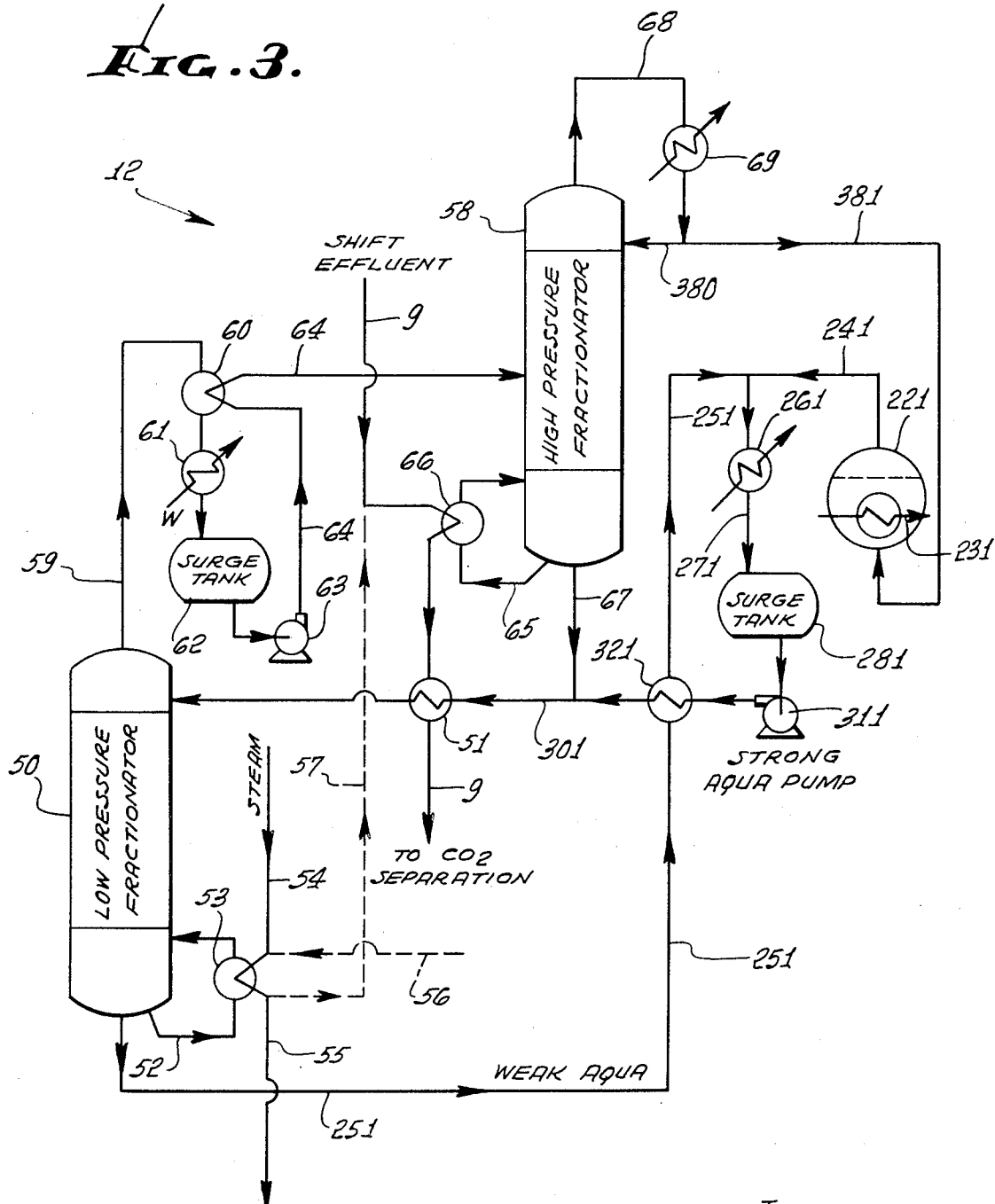
FIG. 3 is a flow sheet of a closed ammonia absorption refrigeration cycle having two fractionators operating at relatively different temperatures and pressures according to the invention.

In general, this embodiment of the invention, illustrated in FIG. 3 of the drawings utilizes a two stage, two pressure distillation of refrigerant from the solvent, e.g. ammonia from water mixture, one stage at relatively high pressure, e.g. at pressure levels suitable for the condensation of nearly pure refrigerant ammonia, namely from 165 to 300 p.s.i.g., depending on the temperature of available cooling medium. The other distillation stage is at relatively lower pressure, one dictated by the temperature of the heat source, e.g. 145 to 170 p.s.i.g. where the shift effluent is available for use starting at about 450° F. In general, the lower distillation pressure can be between 110 and 250 p.s.i.g.

With reference to FIG. 3 the mentioned absorption refrigeration cycle 12 is depicted. The cycle 12 in this embodiment of the invention, includes one or more chillers or evaporators 221 wherein condensed refrigerant, ammonia, is vaporized to generate cold. Line 231 transfers the cold to the synthesis zone 16 (FIG. 1 or 2) for heat exchange there with synthesis zone product gases, specifically to condense product ammonia. The vaporized ammonia refrigerant from evaporator 221 and others typically from —25° F. and 1 p.s.i.g. to +50° F. and 75 p.s.i.g. is passed along line 241 to one or more contactors 261, either an air- or water-cooled heat exchanger, for mixing with a weak aqua absorbent stream from line 251 (0.1 to 10% by weight ammonia) to form a strong aqua stream comprising a condensed and liquefied ammonia and water mixture containing from 15 to 60% ammonia. The strong aqua mixture, typically containing 43% to 55% ammonia, is passed along line 271 through surge tank 281 and pumped by pump 311 to a relatively lower pressure fractionator, depicted as distillation column 50, as feed therefor along line 301 through heat exchangers 321 and 51 for preheating respectively against column 50 weak aqua bottoms in line 251 and shift effluent as shown. Distillation column 50 is of conventional design, incorporating vapor-liquid contacting devices such as trays or packing. The lower pressure distillation column 50 may be operated as indicated at pressures of 110 to 250 p.s.i.g., and at bottom temperatures of 230 to 400° F. and preferably 290° to 360° F. For example the column 50 may be operated with a bottoms temperature of 342 F. and at a pressure of 145 p.s.i.g. Reboiler loop 52 of the lower pressure column 50 heats the column bottoms to the indicated temperature by heat exchange in exchanger 53 against a relatively warm stream in line 54. In preferred practice, steam at 150 p.s.i.g. or higher or lower pressure, e.g. between 100 and 250 to 400 p.s.i.g. and at temperatures above 300° F. is condensed in exchanger 53 to provide the heat demands of column 50. This steam is suitably derived from the furnace 101 (FIG. 4) or other source at high pressure, e.g. 1,500 p.s.i.g. and let down in one or more turbine drivers to e.g. 150 p.s.i.g. Steam condensate from exchanger 53 is passed out of the system along line 55.

Alternatively heat may be supplied to reboiler exchanger 53 by shift effluent entering the exchanger along line 56 (dotted) and exiting the exchanger along line 57 (dotted) for additional use in the reboiler 66 of the higher pressure fractionator, column 58.

The feed to higher pressure fractionating column 58 comprises the overhead stream from low pressure column 50. The stream is passed out of column 50 along line 59, e.g. as over 70% by weight ammonia vapor mixed with water at 282° F. through heat exchanger 60 and water cooler 61 into surge tank 62 at about 100° F. and is then pumped by pump 63 along line 64 through heat exchanger 60 as shown and into column 58 at an intermediate level thereof. Further preheating of this stream, not shown, may be employed if desired. Column 58 is a conventional distillation tower containing trays or packing for effecting vapor-liquid contact. Column 58 is suitably operated at overhead or top temperatures between 90 and 125° F. and pressures between 165 and 300 p.s.i.g. In a typical case, column 58 is operated at 123° F. and 285 p.s.i.g. pressure to produce 99.9% pure ammonia as overhead. The bottom liquids in column 58, typically 20% by weight ammonia and boiling at 318° F. are circulated through reboiler loop 65 having heat exchanger 66. In preferred practice, shift effluent heat exchanged with the absorption refrigeration cycle is at an entrance temperature of 462° F. and a pressure of 382 p.s.i.g. (note that super pressures over 500 p.s.i.g. are not required), is heat exchanged initially with the higher pressure column 58 bottom liquids in reboiler 66, cooled e.g. to 370 F., heat exchanged in exchanger 51 with lower pressure column 50 weak aqua feed in line 301 and returned to the shift effluent stream along line 9 at a temperature of 200° to 265° F. Alternatively the shift effluent may be passed along the (dotted) lines 56, 57 to the reboiler 66 and thence back. A bottoms stream containing typically approximately 20% by weight ammonia is passed from the column 58 along line 67 into line 301 for return to the low pressure fractionator 50 as reflux or recycle feed. Overhead from the higher pressure column 58 typically at 123° F. is condensed in reflux loop 68 by condenser 69, partly returned to column 58 as a reflux in line 380 and the remainder passed along line 381 to evaporator 221 as refrigerant for heat exchange with and cooling of synthesis zone gases.

The specific operating figures given above in conjunction with FIG. 3 are only illustrative. The high relative volatility of refrigerant ammonia over water permits easy obtainment of overhead containing 0.1% water, or less. The operating pressures of the distillation columns are determined by the temperature of the cooling medium used in the overhead condensers and the temperature range of the heating media used in the reboilers. The ammonia content of the weak aqua absorbent (column 50 bottoms) should not be much over 1% by weight and generally may be as low as 0.1% and less than 10% for good practice since greater concentrations may increase cost of operation through resultant higher weak and strong aqua liquid circulation rates.

In conventional synthesis gas generation, shift effluent gases are typically at available at 450° F. or somewhat higher, but these gases rapidly cool to their dew point before giving up much of their heat content. For example, in a typical synthesis gas produced for an ammonia plant, the primary reformer operates at 400 p.s.i.g. with the usual input of 3 to 4 mols of steam per atom of carbon in the feedstock. The exit temperature from the shift reactor is typically 462° F. but the dew point of the shift effluent is only about 350° F. The bulk of its heat content is available only as the effluent cools from this lower temperature as this is derived to a large degree from the gradual condensation of the steam content of this stream.

Increased pressure on the shift effluent will increase its dew point and, hence, the temperature at which heat is released and thus enable operation of the refrigeration plant entirely with the heat in the shift effluent gas. In one embodiment of the present invention, a process for obtaining relatively high pressure synthesis gas for the manufacture of ammonia is provided. Specifically, in this embodiment, a high pressure synthesis gas containing carbon oxides and hydrocarbons is generated, passed to a secondary reformer for introduction of nitrogen and then to shift reactors, at a desired high pressure, e.g. 700 p.s.i.g. and higher. Synthesis gas generation is from a reaction mixture comprising steam and hydrocarbon vapor and by contacting the mixture in a primary reformer at reaction temperature with a catalytically effective amount of a solid catalyst, in steps including, in sequence (1) heating the reaction mixture in a heat zone out of contact with the catalyst to reaction temperature, (2) at a pressure above 150 p.s.i.g. and typically at 700 p.s.i.g. adiabatically reacting the heated reaction mixture in a reaction zone containing the catalyst separate from the heating zone to form a synthesis gas containing effluent, (3) repeating steps (1) and (2) with successive reaction zone effluents as the reaction mixture until the hydrocarbon vapor therein is substantially exhausted, and (4) recovering the synthesis gas thus generated. The successive reaction steps may be effected in separate reaction zones and the successive heating steps in successive heating zones and in alternating sequence. The reaction mixture is passed through a primary reformer comprising an initial reaction zone, an intermediate reaction zone and a final reaction zone. The reaction mixture fed to the initial reaction zone is maintained above about 750° F., and a pressure above about 700 p.s.i.g., the effluent from the initial reaction zone is heated to a temperature above about 900° F. prior to being fed to the intermediate reaction zone. The effluent from the intermediate reaction zone is heated to a temperature above 1400° F. prior to being fed to the final reaction zone. The indicated zone temperatures and inlet pressure can be varied within prescribed ranges, e.g. the initial reaction zone feed temperature may be between 750 and 1000° F., and this reaction zone pressure between 750 and 1500 p.s.i.g. The intermediate reaction zone which may comprise several separate reactors with intervening heating stages may have a feed at a temperature between 900 and 1400° F. and a zone pressure intermediate the initial and final reaction zones. In preferred arrangements of reaction zones and heating stages, the feed to each successive reactor is at a temperature higher than the feed to the previous reactor while the pressure in each successive reactor is lower than the next preceding reactor by an amount equal to the pressure drop through the reactor and heaters. In typical cases the synthesis gas product generated will contain less than about 8 mol percent methane (water-free basis) and be delivered from the process at a pressure of 700 p.s.i.g. or higher.

In another aspect, the mentioned process for synthesis gas generation, includes alternately heating and adiabatically reacting the reaction mixture preferably while advancing the reaction mixture through a temperature graded heating zone progressively from the lower to the higher temperature portions of the zone, the higher temperature portions of the zone being radiantly heated and the lower temperature portions thereof being heated by convection from the radiantly heated portion.

With reference to FIG. 4 in the drawing, the described primary reformer arrangement for obtaining high pressure synthesis gas and thus relatively high pressure shift reactor effluent is depicted as an alternating arrangement of adiabatic reactors and heating coils. Furnace 101 is a vertically extended structure of suitable heat resistant material having a higher temperature, radiant heating section 102 and a lower temperature, convection heating section 103. The furnace may be horizontally disposed as well. Burners 104, 104a and 105 are located in lower furnace section 102 for burning the mixture of fuel and air introduced through lines 106, 106a and 106b to the furnace. Flue gases and other products of combustion and their associated heat contents travel upwardly through the furnace 101 to the convection section 103 so that the furnace interior 107 is at progressively lower heated condition along its length. The furnace 101 may terminate in a conventional stack at 108.

A mixture of steam and hydrocarbon feed vapors is fed to the furnace 101 for heating to desired temperatures and catalytic reaction in contact with catalytically effective amount of a suitable catalyst known per se for conversion of the steam and hydrocarbon vapor into carbon oxides and hydrogen.

The steam portion of the feed comprises superheated steam which may be obtained using the furnace heat or from some nearby process or other source. If produced using the furnace 101, superheated steam is obtained by passing boiler feed water introduced at line 109 through heater coil 110 at the cold end 111 of the furnace, additionally heat exchanging the water feed with an available stream from line 112 in exchanger 113 and thence passing the stream along line 114 again through the furnace, in heater coil 115 for final vaporizing and out along line 116. The saturated steam in line 116 is sent to steam drum 117, which operates at a suitable pressure, e.g. 1500 p.s.i.g. as indicated, and passed from the steam drum along line 118 to superheating coil 119 in the furnace 101. The high pressure superheated steam is passed from the furnace heating coil 119 along line 120 at e.g. 1500 p.s.i.g. and 900° F. to first expansion turbine 121 wherein the steam is expanded and energy recovered therefrom and a portion of the steam at 800 p.s.i.g. and 700° F. is passed along line 122 through heating coil 123 which raises the steam temperature to 1000° F. in line 124 to be combined with hydrocarbon vapors entering the system through line 125, the steam in line 124 being at suitable temperature and pressure for initiating the reforming reaction.

Excess steam is passed along line 126 to second turbine expander 127 wherein its energy is recovered for use elsewhere, e.g. in operating plant compressors, and the water/steam product passed to condensation, waste or recycle along line 128.

The hydrocarbon vapors in line 125 compressing methane, and light hydrocarbons, e.g. containing up to six carbon atoms, up to naphthas or higher hydrocarbons, or any of these, and at a temperature of about 750° F. and a pressure of 800 p.s.i.g. is mixed with the superheated (1000° F.) steam at 700 p.s.i.g. in line 124 at 129. The thus formed reaction mixture is passed to the initial reaction zone along line 130. The initial reaction zone comprises a suitable vessel 131 of any desired shape and suitable material and containing a bed 131a of catalyst.

The reforming reaction in reactor 131 and all other reactors shown in endothermic and accordingly the initial reaction zone effluent, containing the reaction mixture and carbon oxides and hydrogen in some finite amount depending on specific reaction conditions, is passed from the reactor 131 along line 132 at a reduced temperature, e.g. 920° F., and a somewhat lowered pressure owing to the pressure drop across the catalyst bed 131a.

The initial reactor 131 effluent in line 132 is passed through the furnace convection section 103 in heater coil 133 which raises the effluent temperature to about 1100° F. for feeding to the intermediate reaction zone. In the illustrated embodiment, the intermediate reaction zone comprises a plurality of reactors, four of which are shown, i.e. reactors 134, 135, 136 and 137. As will be noted from the broken lines in the drawing, the number of reactors may be varied to provide as many successive reaction stages as desired or required to achieve the substantially complete exhaustion of hydrocarbon, e.g. less than 8 mol percent methane for ammonia synthesis gas. Typically between 3 and 8 separate reaction stages (reactors) will be used in an ammonia synthesis gas primary reformer according to the present process. A separate heating coil is provided in advance of each reactor. Thus heater coil 133 precedes reactor 134, heater coil 139 follows reactor 134 and precedes reactor 135, heater coil 140 follows reactor 135 and precedes reactor 136 and heater coil 141 follows reactor 136 and precedes reactor 137. It will be noted that the several reactors 134–137 as well as initial reactor 131 and final reactor 142 are arranged for series flow connection through intermediate heater coils 133, 139, 140, 141, and 143 with which they alternate and that the successive heater coils progressively approach the radiant heating section 102 of the furnace 101 where burners, 104, 105 are located, i.e. they advance closer to the common heat source defined by the furnace radiant heat section. Accordingly, the several heater coils impart progressively higher temperatures to the fluids passing therethrough as the successive heater coils move downward in location within the furnace 101. Typical temperature rises through the heater coils are from 920° to 1100° F. through heater coil 133 and from 1490° F. to 1600° F. through heater coil 143 leading from intermediate reactor 137 to final reaction zone reactor 142 whence the synthesis gas emerges at typically 700 p.s.i.g. and 1530° F.

Effluent from the primary reformer in line 144 is passed to secondary reformer 145 where the effluent is mixed with air from line 146 which has been preheated in the convection section 103 of the furnace 101 and reacted over catalyst bed 145a. The raw ammonia synthesis gas containing steam, nitrogen, carbon oxides and hydrogen primarily is then passed along line 147 to the shift reactor (not shown in FIG. 5) for conversion of carbon monoxide to carbon dioxide and hydrogen primarily. The effluent from the shift reactor at a pressure of 700 p.s.i.g. or higher and a temperature of 300° F. or higher is a suitable source of heat to the absorption refrigeration distillation column reboiler 53, i.e. has a suitably high dew point (about 390° F.) for effective heat exchange with column 50 bottom liquids at temperatures up to 380° F.

It is also possible, as an alternative to the above, to effectively reboil column bottom liquids employing higher temperature heat sources in the reboiler 53. A hydrocarbon fed ammonia plant has various internal streams at higher temperatures than the shift reactor effluent. However, their heat content is generally more valuable when used for other purposes, e.g. the raising of high pressure steam to be used for motive power and process. Use of heat from sources external to the ammonia plant will usually incur increased costs for the ammonia produced.

For comparative purposes there follows estimated energy requirements for a 1000 short ton/day ammonia plant using (I) Conventional design: steam reforming at 400 p.s.i.g.; $CO_2$ removal by hot activated potassium carbonate, regenerated by heat from the shift reactor effluent and all refrigeration from the mechanical compression of ammonia;

(II) (Example 1) FIG. 1: steam reforming at 400 p.s.i.g.; $CO_2$ removal by propylene carbonate (physical solvent) at 1400 p.s.i.g., all refrigeration by the ammonia absorption system regenerated by heat from the shift reactor effluent;

(III) (Example 2) FIG. 1 and FIG. 4: steam reforming at 700 p.s.i.g.; $CO_2$ removal by propylene carbonate at 1400 p.s.i.g.; all refrigeration by the ammonia absorption system regenerated by heat from the shift reactor effluent.

In each case, all of the major pumps and compressors of the ammonia plant are driven by steam turbines. This motive steam, and the steam required for process purposes, is entirely generated from plant by-product heat. Other than the fuel for the plan furnaces, no energy is brought in from the outside (except for a minor amount of electricity for small pump motors) and none exported. Cooling water for the various plant requirements is supplied from an external unit. Air cooling is not used in these examples.

The pertinent total plant energy requirements for thes three cases compare as follows:

| Case | I | II, Ex. 1 | III, Ex. 2 |
|---|---|---|---|
| Total steam turbine horsepower for compressors and pumps | 39,570 | 34,470 | 31,380 |
| Reformer fired duty, 10⁶ B.t.u./hour | 527 | 496 | 477 |
| Naphtha fuel, pounds/hour | 29,960 | 26,010 | 25,370 |
| 1,500 p.s.i. steam generated, pounds/hour | 474,600 | 446,500 | 452,300 |
| Electric power consumed, kwh./hour | 1,290 | 350 | 400 |
| Cooling water, gal./minute | 44,400 | 38,700 | 39,300 |

The reduced energy requirements of Cases II and III are reflected, as might be expected, in reductions in both the plant capital investment and in the manufacturing cost of ammonia.

The reductions in plant capital investment cost over that of the conventional plant are over 7%, while manufacturing costs are lowered an additional 5% or more.

I claim:

1. In the manufacture of ammonia by reaction of nitrogen with hydrogen obtained from shift effluent, the process which includes indirectly heat exchanging the hydrogen containing shift effluent with a refrigerant-solvent mixture circulating in a closed absorption refrigeration cycle, absorbing carbon dioxide from said effluent with an organic physical solvent therefor, reacting effluent hydrogen with nitrogen in an ammonia synthesis zone to form ammonia and indirectly heat exchanging the synthesis zone gases with refrigerant in said refrigeration cycle to separate ammonia therefrom.

2. Process according to claim 1 in which said organic physical solvent is propylene carbonate.

3. Process according to claim 1 in which ammonia is the refrigerant and water the solvent in said refrigeration cycle.

4. Process according to claim 3 in which said organic physical solvent is propylene carbonate.

5. Process according to claim 1 in which water is the refrigerant and aqueous lithium bromide is the solvent in said refrigeration cycle.

6. Process according to claim 5 in which said organic physical solvent is propylene carbonate.

7. Process according to claim 1 in which said shift reactor effluent is at a pressure above about 250 p.s.i.g.

8. Process according to claim 1 in which said ammonia is cooled to a temperature between about −15 and +100° F.

9. Process according to claim 1 including effecting $CO_2$ removal from said effluent at a pressure above about 700 p.s.i.g.

10. Process for the manufacture of ammonia which includes generating a shift reactor effluent containing hydrogen, operating a closed ammonia-water absorption refrigeration cycle including an absorption zone, a fractionation zone adapted to separate ammonia from water and an expansion zone adapted to evaporate ammonia to produce cold, supplying fractionation zone heat demand by indirect heat exchange with said shift reactor effluent, separating carbon dioxide from the cooled effluent at a pressure above about 700 p.s.i.g. by absorption with an organic physical solvent for carbon dioxide, reacting the effluent hydrogen free of carbon dioxide with nitrogen in an ammonia synthesis zone to form ammonia, using ammonia refrigerant to condense the ammonia product and returning the heat exchanged ammonia refrigerant to the closed absorption refrigeration cycle for regeneration.

11. Process according to claim 10 in which said organic physical solvent is propylene carbonate.

12. Process according to claim 10 in which said ammonia product is cooled to between −15° and +100° F.

13. Process according to claim 10 in which said fractionation zone includes plural fractionation columns operating at different pressure and temperature conditions and in series flow connection for successively higher pressure and higher temperature distillations of said ammonia refrigerant dissolved in the solvent water.

14. Process according to claim 13 including reboiling the higher pressure column liquids against said shift effluent only.

15. Process according to claim 13 including also reboiling the lower pressure column liquids against an available heat source other than shift effluent.

16. Process according to claim 13 including operating the lower pressure fractionation column at a bottom temperature between about 290° and 400° F. and at a pressure between about 110 and 250 p.s.i.g.

17. Process according to claim 16 including operating the higher pressure fractionation column at a top temperature between about 90° and 125° F. and at a pressure between about 165 and 300 p.s.i.g.

18. Process according to claim 13 in which the lower pressure fractionation column is arranged to feed its overhead to an intermediate level of the higher pressure fractionation column and operating said lower pressure column at a bottom temperature between about 230 and 360° F. and a pressure between 110 and 250 p.s.i.g.

19. Process according to claim 18 in which said lower pressure fractionation column bottom liquids are reboiled against steam at a temperature about 365° F. and at a pressure above 150 p.s.i.g.

20. Process according to claim 19 in which said organic physical solvent is propylene carbonate.

21. Process according to claim 11 including also effecting said fractionation in plural fractionation columns operating at successively higher pressures, reboiling the lower pressure fractionation mixture against 100 to 400 p.s.i.g. steam and reboiling the higher pressure fractionation mixture against said shift effluent.

22. In a process for the manufacture of ammonia which includes generating a shift effluent containing hydrogen and $CO_2$, dissolving the $CO_2$ in a combined oxygen-containing organic physical solvent therefor, reacting the hydrogen with nitrogen to form ammonia and cooling the ammonia to effect separation thereof, the steps including operating a closed ammonia-water absorption refrigeration cycle comprising an absorption zone, a fractionation zone and an expansion zone, said fractionation zone having a relatively lower pressure first fractionation column adapted to separate ammonia and water overhead and low ammonia content bottoms and a second fractionation column adapted to separate substantially water-free ammonia overhead, by feeding the first column overhead to the second column and recycling the second column bottoms to the first column, and heating the second column by heat exchange with said shift effluent, vaporizing the second column overhead product in said expansion zone and heat exchanging the expanded and cooled second column overhead product with synthesis gases to cool formed ammonia product and separate the same.

23. The process according to claim 22 including also heating said first column bottoms liquids with said shift effluent.

24. The process according to claim 22 in which said first column is operated at a pressure between about 110 and 250 p.s.i.g., and a bottom temperature between about 290° and 400° F., and in which said second column is operated at a pressure between about 165 and 300 p.s.i.g., and a top temperature between about 90° and 125° F.

References Cited
UNITED STATES PATENTS

| | | | |
|---|---|---|---|
| 2,926,751 | 3/1960 | Kohl et al. | 55—68 |
| 3,266,219 | 8/1966 | Woertz | 55—68 |
| 3,618,331 | 11/1971 | Smith et al. | 55—68 |
| 3,441,393 | 4/1969 | Finneran et al. | 23—198 X |
| 3,567,381 | 3/1971 | Beavon et al. | 23—199 X |
| 3,343,916 | 9/1967 | Cohn et al. | 23—199 |
| 1,570,485 | 2/1925 | Harter | 23—199 |

OSCAR R. VERTIZ, Primary Examiner

H. S. MILLER, Assistant Examiner

U.S. Cl. X.R.

23—289; 48—196 K

UNITED STATES PATENT OFFICE
CERTIFICATE OF CORRECTION

Patent No. 3,743,699　　　　　　　　Dated July 3, 1973

Inventor(s) Marcel J. P. Bogart

It is certified that error appears in the above-identified patent and that said Letters Patent are hereby corrected as shown below:

Column 1, line 29; "is the economic use of organic solvents in place of con-" should read --is the economic use of organic physical solvents in place of con- --.

Column 3, line 52; "includes a steam reforming a hydrocarbon feed to hydro-" should read --includes steam reforming a hydrocarbon feed to hydro- --.

Column 4, line 66; "through napha is fed into the ammonia plant at 1, passed" should read --through naptha is fed into the ammonia plant at 1, passed--.

Column 7, line 9; "The column bottom liquid is reboiled aaginst relatively" should read --The column bottom liquid is reboiled against relatively--.

Column 7, line 24; "effluent. This embodiment may be illustrated with shaft" should read --effluent. This embodiment may be illustrated with shift--.

Column 7, line 49; "ically to condensate product ammonia. The vaporized am-" should read --ically to condense product ammonia. The vaporized am- --.

Column 9, line 24; "(1) heating the reaction mixture in a heat zone out of" should read --(1) heating the reaction mixture in a heating zone out of--.

UNITED STATES PATENT OFFICE
CERTIFICATE OF CORRECTION

Patent No. 3,743,699                    Dated    July 3, 1973

Inventor(s) Marcel J. P. Bogart

It is certified that error appears in the above-identified patent and that said Letters Patent are hereby corrected as shown below:

Column 10, line 55; "The hydrocarbon vapors in line 125 compressing meth-" should read --The hydrocarbon vapors in line 125 comprising meth- --.

Column 11, line 46; "of 700 p.s.i.g. or higher and a temperature of 300°F. or" should read --of 700 p.s.i.g. or higher and a temperature of 390°F. or--.

Column 12, line 10; "Other than the fuel for the plan furnaces, no energy is" should read --Other than the fuel for the plant furnaces, no energy is--.

Column 12, line 16; "The pertinent total plant energy requirements for thes" should read --The pertinent total plant energy requirements for these--.

Signed and sealed this 27th day of November 1973.

(SEAL)
Attest:

EDWARD M. FLETCHER, JR.                RENE D. TEGTMEYER
Attesting Officer                      Acting Commissioner of Patents